H. O. JACKSON & H. C. VIZENTS.
ELECTRIC SELF WINDING CLOCK.
APPLICATION FILED APR. 24, 1908.

909,417.  Patented Jan. 12, 1909.
6 SHEETS—SHEET 1.

Witnesses:
John Enders
Chas. H. Buell

Inventors:
Henry O. Jackson and
Herman C. Vizents.
By Dyrenforth, Lee, Chritton & Wiles
Attys.

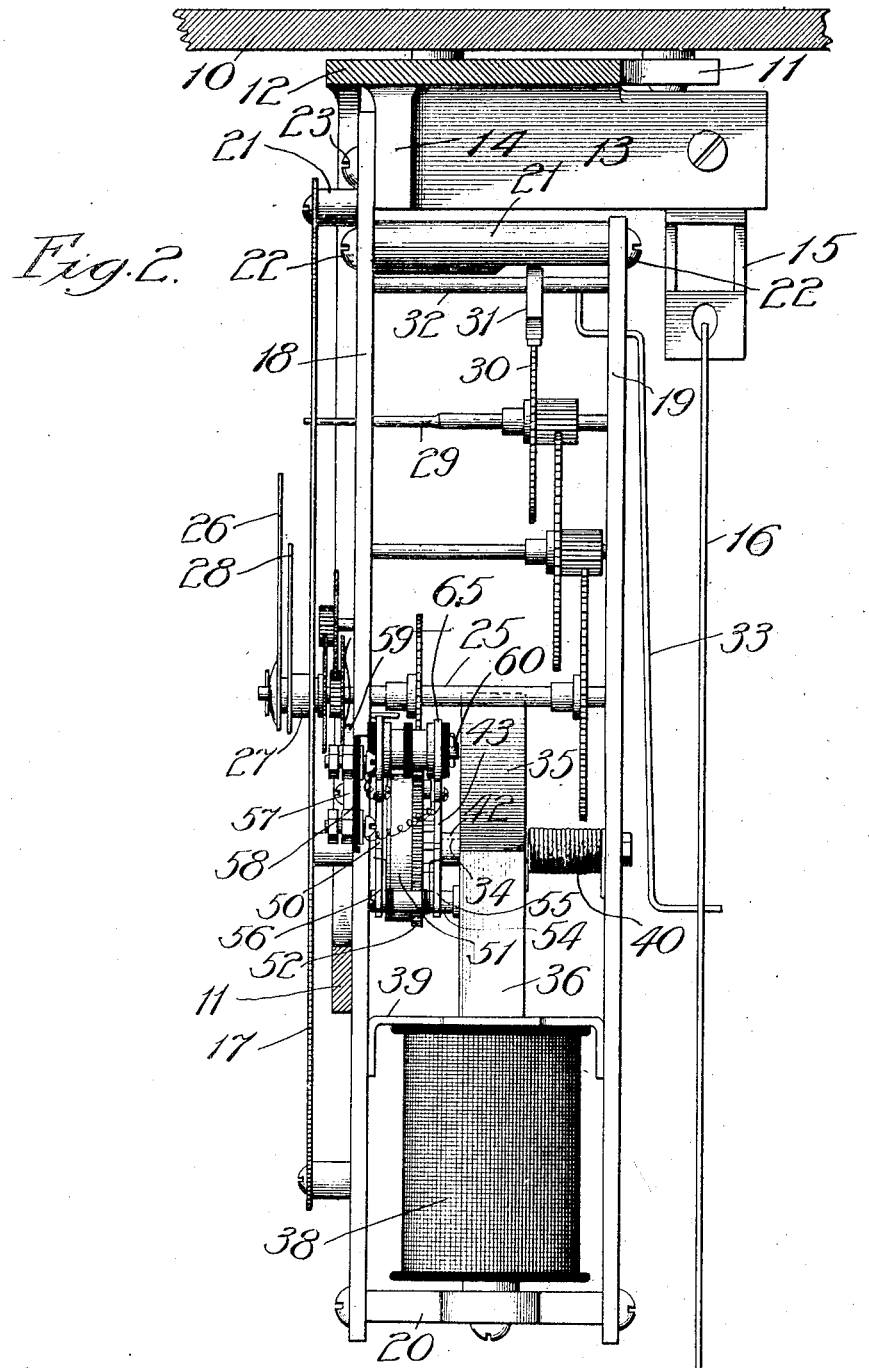

H. O. JACKSON & H. C. VIZENTS.
ELECTRIC SELF WINDING CLOCK.
APPLICATION FILED APR. 24, 1908.
909,417.
Patented Jan. 12, 1909.
6 SHEETS—SHEET 3.
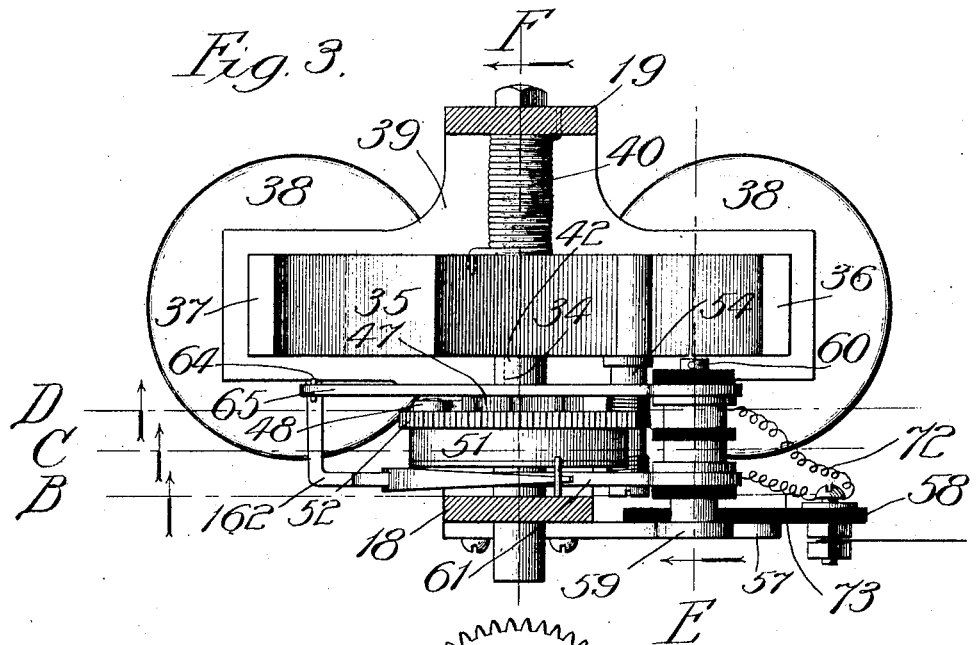
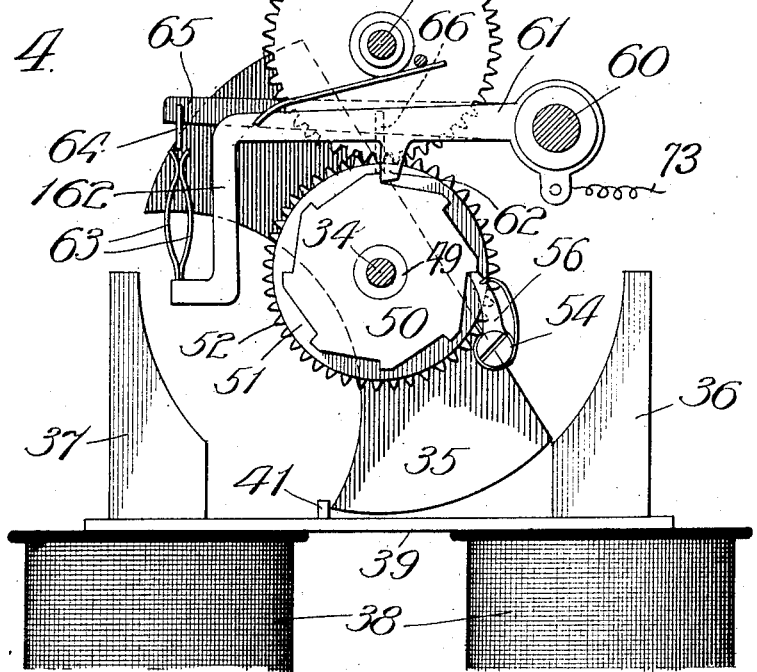
Witnesses:
John Enders
Chas. H. Buell
Inventors:
Henry O. Jackson
Herman C. Vizents
By Dyrenforth, Lee, Chritton & Wiles
Attys H. O. JACKSON & H. C. VIZENTS.
ELECTRIC SELF WINDING CLOCK.
APPLICATION FILED APR. 24, 1908.

909,417.

Patented Jan. 12, 1909.
6 SHEETS—SHEET 4.

Witnesses
John Enders
Chas. H. Buell

Inventors:
Henry O. Jackson
Herman C. Vizents
By Dyrenforth, Lee, Chritton & Wiles
Attys.

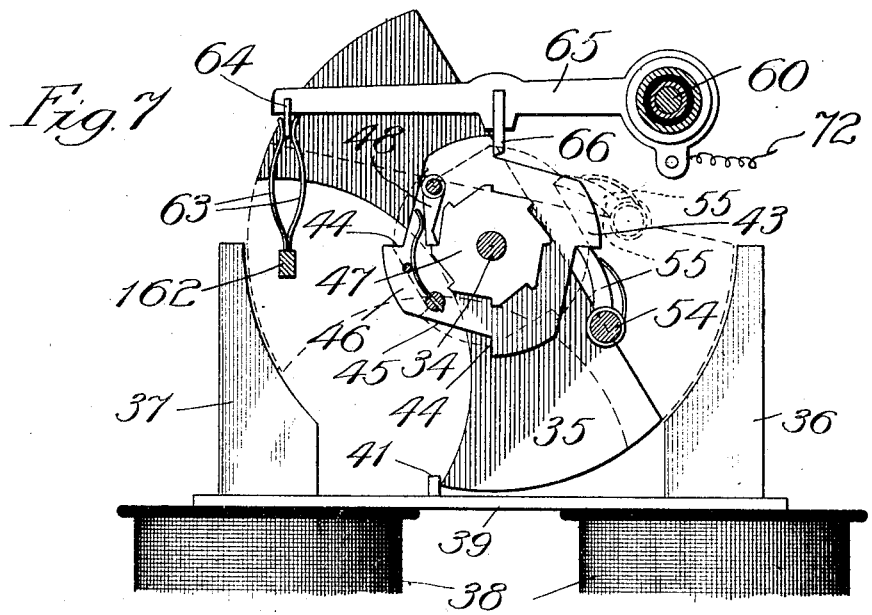

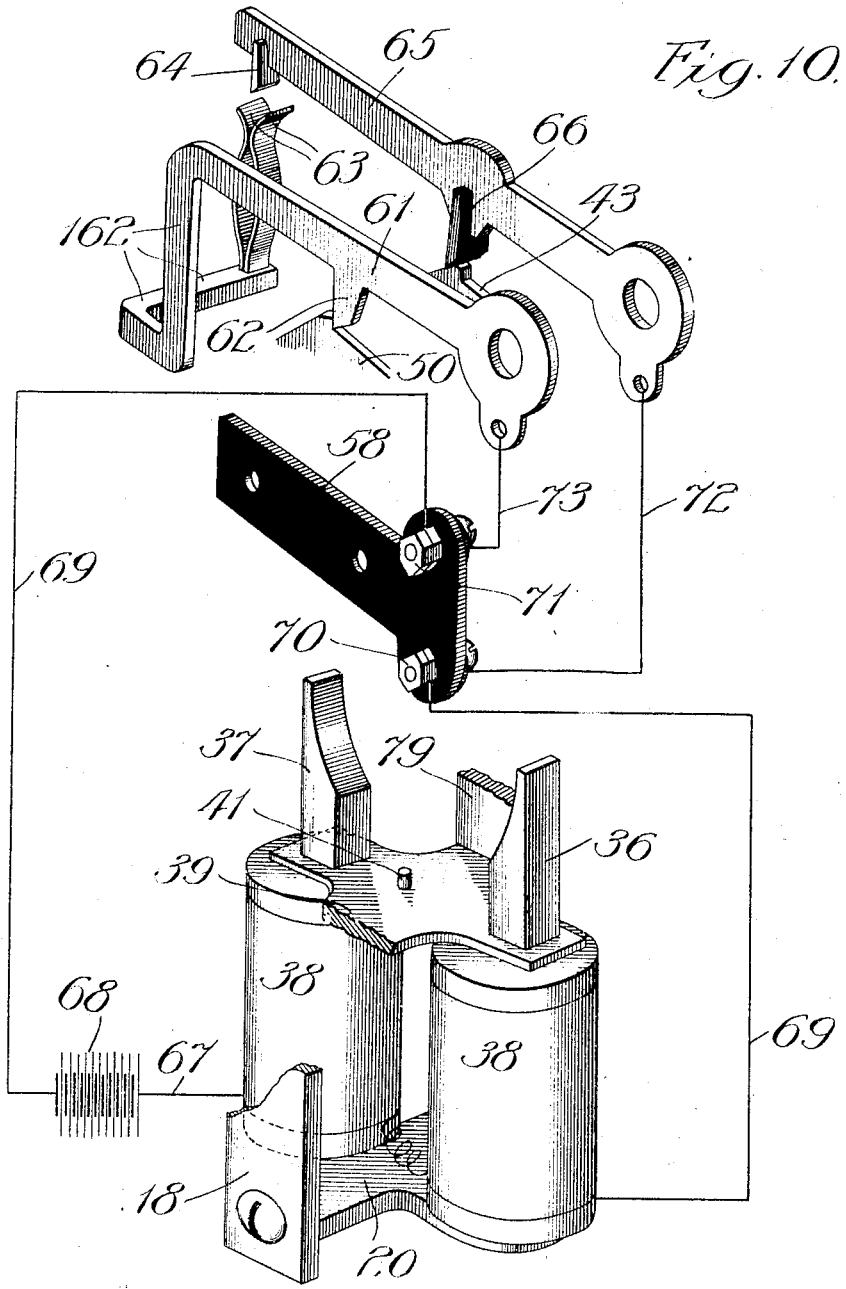

UNITED STATES PATENT OFFICE.

HENRY O. JACKSON AND HERMAN C. VIZENTS, OF CHICAGO, ILLINOIS, ASSIGNORS, BY MESNE ASSIGNMENTS, TO TOM McNAUGHTON, OF LONDON, ENGLAND.

ELECTRIC SELF-WINDING CLOCK.

No. 909,417.     Specification of Letters Patent.     Patented Jan. 12, 1909.

Application filed April 24, 1908. Serial No. 429,064.

*To all whom it may concern:*

Be it known that we, HENRY O. JACKSON and HERMAN C. VIZENTS, citizens of the United States, residing at Chicago, in the county of Cook and State of Illinois, have invented a new and useful Improvement in Electric Self-Winding Clocks, of which the following is a specification.

Our invention relates to an improvement in self-winding clocks wherein the clock-train is spring-driven and the spring is automatically wound periodically by the action of the armature of an electro-magnet when energized by an electric current.

Figure 1:
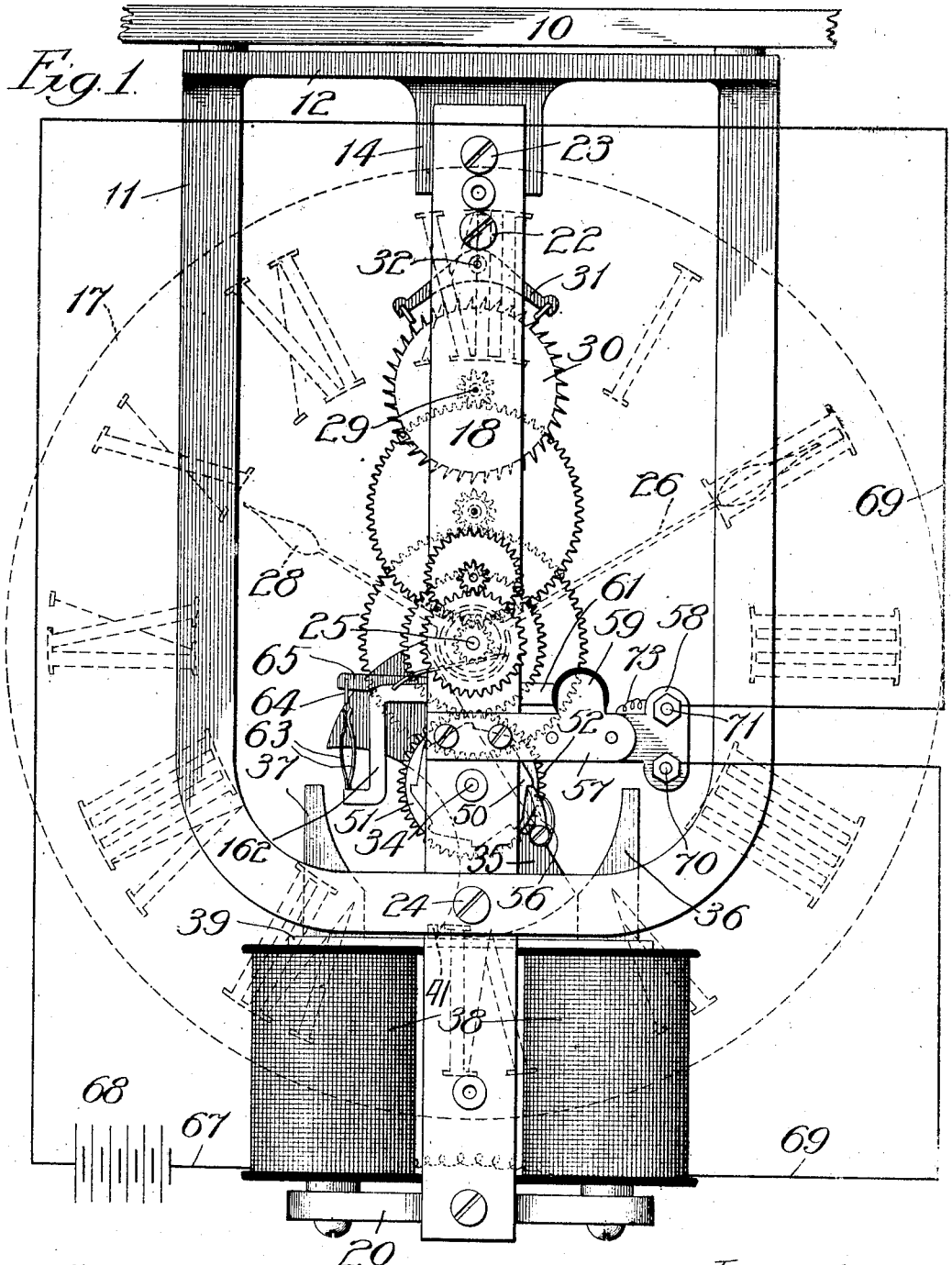
Figure 5:
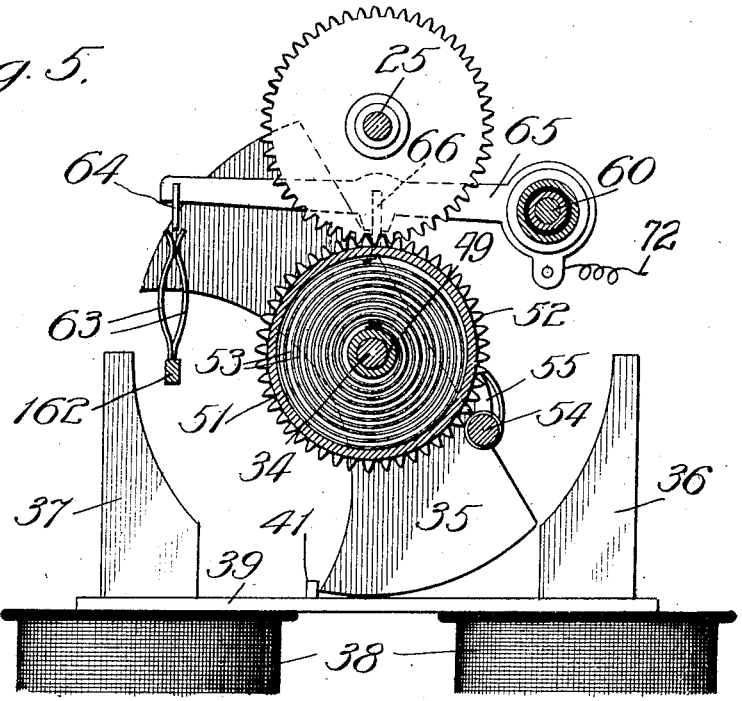
Figure 6:
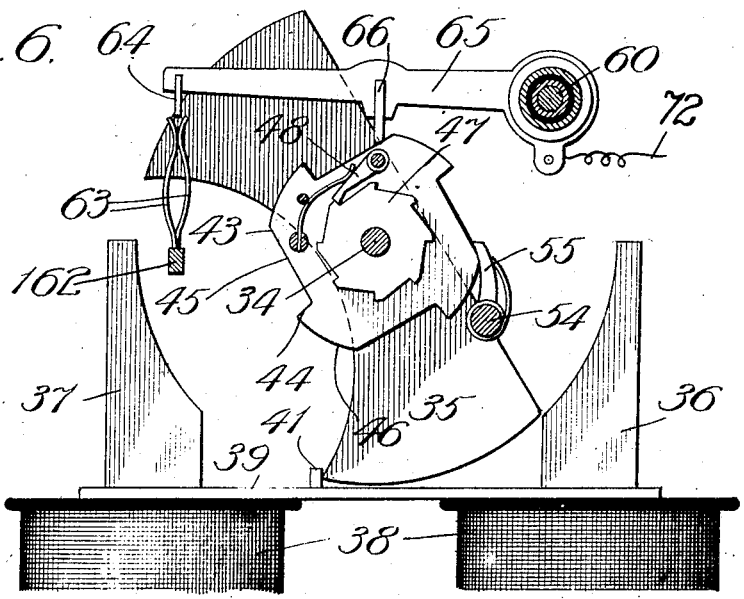

In the accompanying drawings, Figure 1 illustrates our improved clock-mechanism by a view in front elevation, partly by dotted representation and with a portion of the case shown broken; Fig. 2 is a view of the same in side elevation, partly sectional; Fig. 3, an enlarged plan section on line A, Fig. 8; Figs. 4, 5 and 6 are sections taken, respectively, on lines B, C and D, Fig. 3; Fig. 7, a section like that presented in Fig. 6, but showing the mechanism in a different position, to which it has been advanced by the power of the clock-spring; Fig. 8 and 9 are sections taken, respectively, on lines E and F, Fig. 3, and Fig. 10 is a broken perspective diagram of the mechanism included in the electric circuits.

Of the clock-case, which may be of any suitable construction or variety, only a portion of the top 10 is shown as affording the support for the mechanism hereinafter described on a bracket 11, of general U-shape, depending from the forward corner-portions of a metal plate 12, with which the bracket is shown to be integral and which is fastened, as by screws, flatwise against the under surface of the case-top 10; and a transverse central web 13 is formed on the under side of the plate, this web terminating at its forward end in a head 14 and carrying suspended by its rear end the hanger 15 for the pendulum-rod 16. The clock-dial is indicated at 17 (by dotted representation in Fig. 1). The clock-mechanism is supported in a frame shown to consist of the front and rear vertical bars 18 and 19 rigidly connected at their lower ends by a base 20, having lateral extensions forming seats for the spools of an electromagnet, hereinafter described, and similarly connected at their upper ends by a spacer-bar 21 interposed between them and fastened at its ends by screws 22. This frame affords bearings for all the parts and is fastened rigidly in vertical position by a screw 23 passing through the upper end of the frame-bar 18 into the head 14, and by a screw 24 passing through the base of the U-shaped bracket into that frame-bar just below its transverse center. The minute-arbor 25 of the clock-mechanism, carrying the hand 26, is journaled, like all the other shafts thereof, in bearings in the two vertical frame-bars, and it is geared in the usual or any similar manner to a sleeve 27 carrying the hour-hand 28, and is also connected by a suitable train of gearing with the shaft 29 which may carry the seconds-hand (not shown) and on which the escapement-wheel 30 is provided for coöperation with the escape-lever 31 on a shaft 32 carrying the depending bent arm 33 engaging the pendulum-rod 16 for swinging the pendulum. The parts thus far described present no important feature of novelty.

Directly below the minutes-hand shaft 25 is rigidly fastened at its ends in the frame-bars a support shown in the form of a rod 34 on which is journaled between its ends, and preferably midway between them, an armature 35 shown to be provided with convexly arc-shaped extremities to conform to the concavely arc-shaped inner faces of extensions of the poles 36 and 37 of an electromagnet 38, the spools of which are secured to the seats afforded by the lateral extensions of the frame-base 20. A cap-plate 39 fastened between the frame-bars is extended laterally over the tops of the magnet spools to assist in securing them in place, and the pole-pieces project through these extensions. A spring 40 on the rod 34 has its ends connected respectively with the armature and rear frame-bar to tend to maintain the armature in the normally inclined position in which it is represented of abutting against a stop 41, wherein one end is in close proximity to the base of the concave face of the magnet-pole 36 and its other end is removed from the upper end of the corresponding face of the opposite pole. The rod 34 is loosely surrounded, adjacent to the armature, by the hub 42 of a ratchet 43 of peculiar formation. The teeth 44 of this ratchet, of which four are shown, as the preferred number, are equidistant apart with the periphery of the wheel, between successive teeth, formed with a straight or segment-like section 45 extending from the base of a tooth one-half the distance between the teeth, and an arc-shaped section 46 concentric with the axis of the ratchet and extending the other half of the distance between the teeth. On the forward face of this ratchet is formed, to be integral and concentric therewith, a smaller ratchet 47 shown to be provided with eight teeth, of which alternate ones coincide with the ratchet-teeth 44; and the ratchet 47 is engaged by a spring-pawl 48 on the barrel hereinafter described. The hub 49 of an eight-toothed ratchet 50 (shown of smaller diameter than the ratchet 43) loosely surrounds the rod 34 near its forward end and extends centrally within a barrel 51 carrying the pawl 48 and having formed about its rear circumference a gear 52, this barrel being loose upon the rod 34; and in the barrel is confined a clock-spring 53 with its inner end fastened to the hub and its outer end to the barrel (Fig. 5), whereby turning the ratchet 50 in one direction winds the spring, the unwinding of which turns the barrel to actuate the clock-train through the medium of the gear 52. The straight peripheral spaces between the teeth of the ratchet 50 correspond substantially with the straight sections 45 of the ratchet 43 and are each practically equal in length to a section 45. A stud 54 extends laterally from the pivotal armature across the faces of the two ratchets 43 and 50 and carries a spring-pawl 55 engaging the ratchet 43 and a similar pawl 56 engaging the ratchet 50. A metal bearing-bar 57 is secured to the face of the frame-bar 18 to project beyond a lateral edge of the same, where it has secured to its end a head 58 of insulating material, adjacent to which the bar has formed upon it an upwardly projecting ear 59 carrying a rearwardly extending horizontal stud 60. This stud has journaled upon it near its forward end one end of a spring-pressed lever 61 extending in the plane of the ratchet 50 and carrying a finger 62 depending to engage the ratchet-teeth as a detent; and this lever is bent at a right-angle toward its free end to form the depending arm 162 of inverted L-shape (Fig. 4) from the extremity of which it is deflected to extend horizontally backward, and carries on its rear end the pair of upwardly projecting spring contact-fingers 63. The upper diverging ends of these contact-fingers register with a contact-finger 64 depending from the free end of a lever 65 fulcrumed at its opposite end on the stud 60 to extend in the plane of the ratchet 43 on the circumference of which rides a finger 66 depending from the lever and termed a "jewel," being formed preferably of agate, though it may be composed of other suitable insulating material.

One end of the coils of the electromagnet is connected by a wire 67 with one terminal of an electric-current generator, indicated conventionally at 68 in Fig. 1, but which is preferably a dry battery stored in the bottom of the clock-case. The other end of the magnet-coils is connected with the opposite terminal of the generator by a wire 69 leading to a binding-post 70 on the insulating head 58 and continued from a similar binding-post 71 on said head to said generator-terminal. The binding-post 70 is connected by a branch-wire 72 with the fulcrumed end of the lever 65, and the binding-post 71 is connected by a branch-wire 73 with the fulcrumed end of the lever 61, whereby the circuit is closed by engagement of the finger 64 with the fingers 63 and broken by separating those fingers.

The operation is as follows: The clock-spring turns the barrel 51 and thereby rotates the gear 52 to drive the clock-movement in a usual manner. In thus turning, the pawl 48 on the barrel turns the ratchet 47, thereby riding the periphery of the ratchet 43 from the starting position represented in Fig. 6, across the engaging end of the finger 66 until the respective section 46 of the ratchet clears the contacting end of the finger, which then drops at a tooth 44 against the succeeding ratchet-section 45, to the position represented in Fig. 7, thereby permitting the lever 65 to drop and contact the finger 64 with the fingers 63 to close the circuit. The circuit remains momentarily closed until opened by the turning of the armature, as hereinafter described, to rewind the clock-spring. The preferred arrangement, which is that represented, is such as to cause the described circuit-closure to occur once in each seven and one-half minutes or eight times in each hour. With each closure of the circuit the electro-magnet is energized to attract the armature at its ends and turn it to or toward a horizontal position between the poles, thus to the dotted position in Fig. 7. In so turning the armature, it engages the pawl 56 with the ratchet 50 to turn the hub 49 to which the clock-spring is fastened at its inner end and thus wind that spring to the extent to which it unwound during the aforesaid period. In the spring-winding operation of the armature the pawls 55 and 56 carried by it turn the ratchets 50 and 43 to ride their straight peripheral sections underneath the fingers 66 and 62, thereby raising the two levers correspondingly and maintaining the circuit-closure until the finger 66 arrives at a ratchet-section 46, when the finger 62 arrives at the end of a straight section of the ratchet 50 and quickly drops at a tooth thereof, thereby separating the lower contacts from the upper one and opening the circuit so rapidly as to avoid drawing a spark. With the deënergizing of the magnet 38, which ensues when the circuit is opened, the spring 40 returns the armature with the pawls 55 and 56, to normal position, while the finger 62 on the lever 61, by its engagement with the ratchet 50, serves as a detent against the tendency of the clock-spring to reverse the turning of that ratchet.

By the improvement thus described the primary object is attained of producing the greatest amount of power with the least expenditure of electrical energy, since in the normal position of the armature relative to the magnet-poles one of its ends is first attracted by the one pole in close proximity to it, which exerts sufficient power to start the winding of the spring in its most relaxed and therefore relatively weakest condition, whereas, as the resistance to the winding of the spring increases with its increasing tension, the other end of the armature is brought into the field of attraction of its adjacent magnet-pole, thereby to supplement the power of the first pole in overcoming the increased spring-resistance. The further object is attained of using the minimum amount of battery-power for the spring-winding by assuring opening of the circuit with each re-winding operation. Moreover, the improvement prevents the possibility of the stoppage or running down of the clock with a weakened battery, so long as it supplies sufficient power to turn the armature against the resistance of the clock-spring in any partially relaxed or unwound condition thereof. Thus, if the battery is too weak to re-wind the spring to its degree of complete winding from its relaxed condition resulting from running the clock during a predetermined period, as the seven and one-half minutes specified, the armature will not be sufficiently turned by the magnet at the end of that period, and the spring, in running the clock during another like period, will relax that much more and present less resistance to re-winding, for which the current from the weakened battery will be sufficient; and so on until the battery entirely gives out or becomes too weak to partially wind the clock-spring in any degree of relaxation thereof in which it is still sufficiently powerful to run the movement. It will be seen, therefore, that the invention enables the battery to be practically used up completely, before it becomes inoperative. As will be observed, the re-winding of the spring is performed in a manner to avoid, meantime, any drag upon or opposition to the running of the movement, because in rewinding both ratchets 43 and 50 turn in the same direction as the barrel turns.

The greater diameter of the ratchet 43 relative to the ratchet 50 provides for the following contingency: Should the armature, for any reason, fail to turn the ratchet 50 far enough to register a tooth thereof with the finger 62, without providing means to prevent, the battery would soon become exhausted since the circuit would remain closed, because the lever 61 would not drop, as described, to open it. This is prevented by providing the ratchet 43 of the greater relative diameter, since in the continued turning of that ratchet under the driving action of the clock-movement, it will ride an arc-shaped section 46 under the finger 66 and thereby raise the lever 65 sufficiently far to lift the contact-finger 64 out of engagement with the other fingers 63, and thus break the circuit.

We claim—

1. In an electric self-winding clock, the combination with a frame, of a clock-train supported thereon, a support in said frame, a barrel mounted on said support and carrying the driving gear for said train and a pawl, a clock-spring confined in the barrel with one end secured thereto, an electro-magnet, an energizing-circuit for said magnet, an armature, levers in said circuit carrying coöperating circuit-closing contact-fingers, a circuit-closing ratchet on said support with which one of said levers engages, and carrying a smaller ratchet engaged by said pawl, a circuit-opening ratchet on said support having the opposite end of the clock-spring fastened to it, and pawls on the armature engaging said circuit closing and opening ratchets, for the purpose set forth.

2. In an electric self-winding clock, the combination with a frame, of a clock-train supported thereon, a support in said frame, a barrel mounted on said support and carrying the driving-gear for said train and a pawl, a clock-spring confined in the barrel with one end secured thereto, an electro-magnet, an energizing-circuit for said magnet, an armature journaled on said support to extend its opposite ends into proximity to the respective magnet-poles, levers in said circuit carrying coöperating circuit-closing contact-fingers, a circuit-closing ratchet on said support with which one of said levers engages and carrying a smaller ratchet engaged by said pawl, a circuit-opening ratchet on said support having the opposite end of the clock-spring fastened to it and provided with teeth forming a multiple of the number thereof on said first-named ratchet, and pawls on the armature engaging said circuit closing and opening ratchets, for the purpose set forth.

3. In an electric self-winding clock, the combination with a frame, of a clock-train supported thereon, a support in said frame, a barrel on said support carrying the driving-gear for said train, a clock-spring confined in the barrel with one end secured thereto, an electro-magnet and energizing-circuit therefor, a swinging armature for said magnet, a pair of levers in said circuit carrying coöperating circuit-closing contact-fingers, a circuit-closing ratchet on said support having a driving connection with said barrel and provided between successive teeth with concentric arc-shaped and straight peripheral sections, a finger on one of said levers engaging with the periphery of said ratchet, a pawl on the armature engaging said ratchet, and armature-actuated means connected with said spring to wind it by movement of the armature, for the purpose set forth.

4. In an electric self-winding clock, the combination with a frame, of a clock-train supported thereon, a support in said frame, a barrel on said support carrying the driving-gear for said train and a pawl, a clock-spring confined in the barrel with one end secured thereto, an electro-magnet and an energizing-circuit therefor, an armature journaled between its ends on said support to extend said ends respectively into proximity to the magnet-poles, a pair of levers in said circuit carrying coöperating circuit-closing contact-fingers, a circuit-closing ratchet on said support carrying a smaller ratchet engaged by said pawl and provided uniformly between successive teeth with successive arc-shaped and straight peripheral sections, a finger on one of said levers engaging said sectional periphery, a circuit-opening ratchet on said support having the opposite end of the clock-spring fastened to it and provided with teeth forming a multiple of the number thereof on said first-named ratchet, a detent extending from the other lever into engagement with said circuit-opening ratchet, and pawls on the armature engaging said circuit-closing and opening ratchets, for the purpose set forth.

HENRY O. JACKSON.
HERMAN C. VIZENTS.

In presence of—
RALPH A. SCHAEFER,
JOHN SCHUCK.